W. R. MENGEL.
STEREOPTICON.
APPLICATION FILED NOV. 29, 1918. RENEWED MAR. 13, 1920.

1,355,096.

Patented Oct. 5, 1920.
2 SHEETS—SHEET 1.

William R. Mengel, Inventor

By his Attorney
Harry Lea Dodson

W. R. MENGEL.
STEREOPTICON.
APPLICATION FILED NOV. 29, 1918. RENEWED MAR. 13, 1920.
1,355,096.
Patented Oct. 5, 1920.
2 SHEETS—SHEET 2.
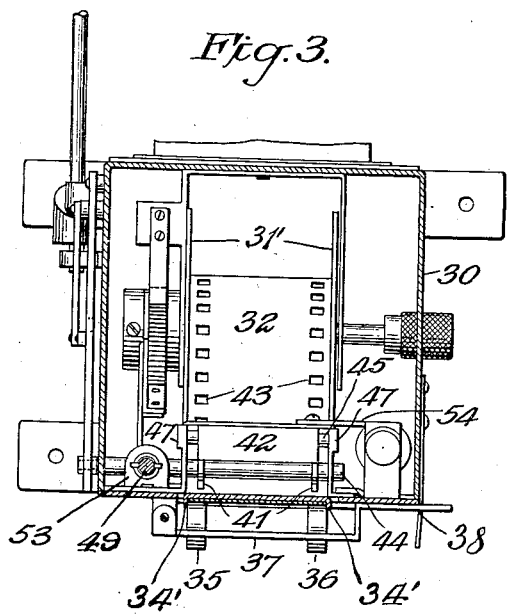
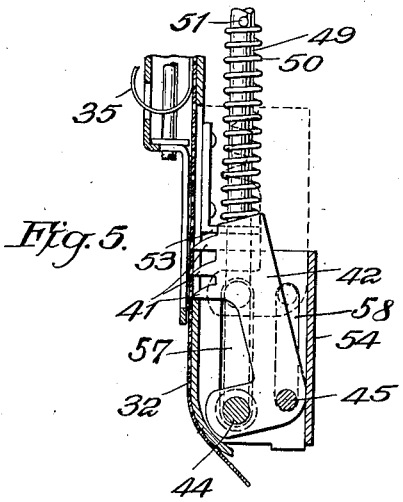
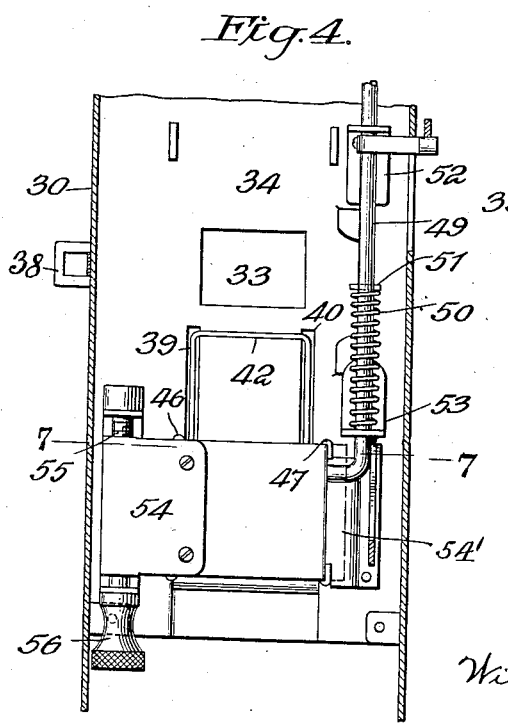
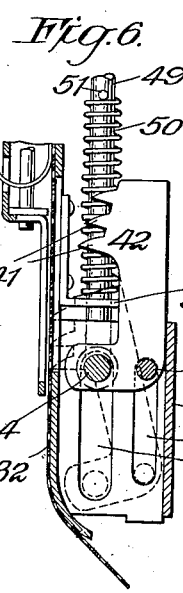
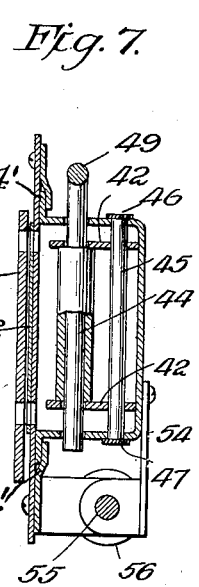
William R. Mengel, Inventor
By his Attorney
Harry Lea Dodson.

UNITED STATES PATENT OFFICE.

WILLIAM R. MENGEL, OF CHICAGO, ILLINOIS, ASSIGNOR TO AUTOPTICON COMPANY, OF CHICAGO, ILLINOIS, A CORPORATION OF ILLINOIS.

STEREOPTICON.

1,355,096. Specification of Letters Patent. Patented Oct. 5, 1920.

Original application filed May 31, 1917, Serial No. 171,874. Divided and this application filed November 29, 1918, Serial No. 264,502. Renewed March 13, 1920. Serial No. 365,624.

*To all whom it may concern:*

Be it known that I, WILLIAM R. MENGEL, a citizen of the United States, residing at Chicago, in the county of Cook and State of Illinois, have invented a certain new and useful Improvement in Stereopticons, of which the following is a specification.

My invention relates to that class of stereopticons which are designed to substitute a roll of film negatives in place of glass plates, the latter being objectionable due to the fact that they are expensive, and being fragile, are frequently broken.

In my improved device, it is possible to use a roll of film in the place of the glass slides. My invention as hereinafter described relates to the device described in my copending application Serial No. 171874 of which this case is a division and appertains to the means for intermittently feeding the film for the device as set forth in the said application and has for its object to provide means whereby the film may be moved a predetermined distance intermittently and has for its further object to provide an adjustment of the film moving mechanism so as to insure its registration with the perforations formed on the edges of the film strip.

My means of accomplishing the foregoing objects may be more readily understood by having reference to the accompanying drawings, which are hereunto annexed and are a part of this specification, in which:

Fig. 3, is a horizontal sectional view on line 3—3, Fig. 1.

Fig. 4, is a fragmentary rear elevation of the film actuating mechanism and accessories.

Figs. 5 and 6, are companion enlarged detailed longitudinal sections illustrating the film actuating pawl and accessories in their lower and upper positions, respectively.

Fig. 7, is a detail horizontal section on line 7—7, Fig. 4.

Similar reference numerals refer to similar parts throughout the entire description.

Figure 1:
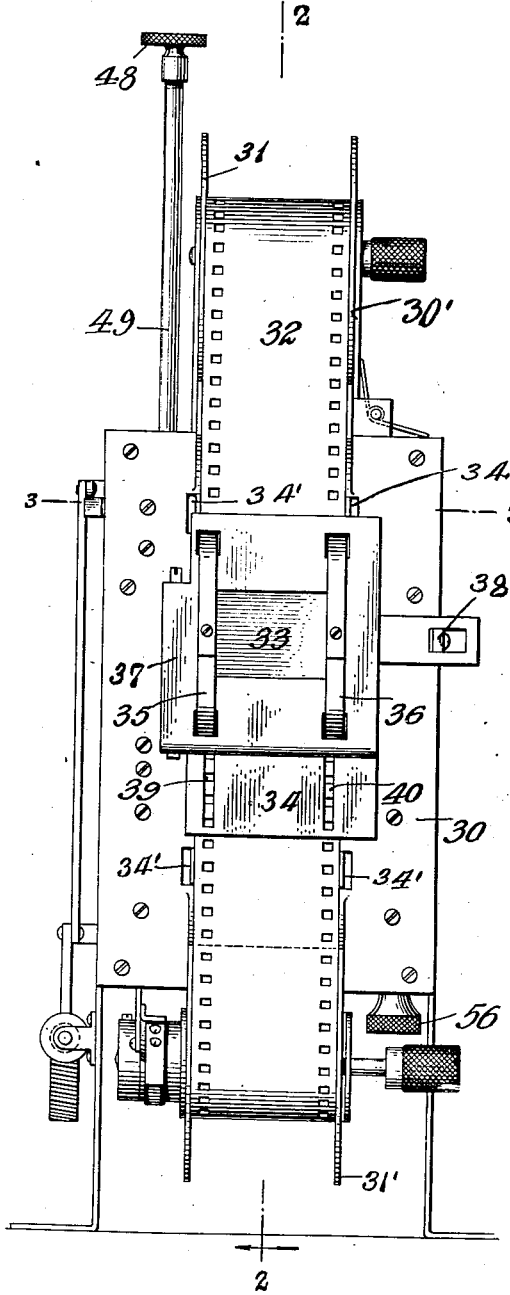
Figure 1, is a front elevation of the film supporting and actuating means of a portable stereopticon, showing the general arrangement of parts in the present invention.
Figure 2:
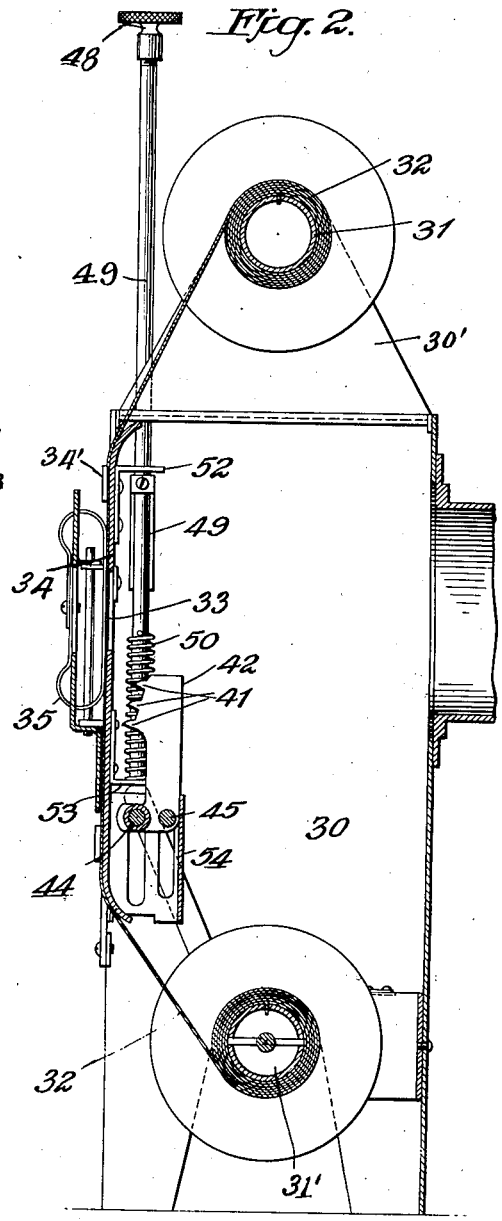
Fig. 2, is a longitudinal sectional elevation on line 2—2, Fig. 1.

As shown in the drawings the film operating device comprises a rectangular casing 30, provided at top with bearing brackets 30' in which is journaled the supply reel 31, of the picture film 32, in a detachable manner, and to such end one of the bearing brackets 30' is pivoted at its lower end to the casing 30, and provided with a spring by which it is held in supporting engagement with the reel 31 as shown in Fig. 1. Near its lower end the casing 30 is provided with suitable bearings for the film take-up reel 31' which is preferably operated by means set forth in my aforesaid application Serial No. 171,874, of which this application is a division. The picture film extends down past the aperture 33 formed in the aperture plate or wall 34 of the casing 30 and is held against this wall by means of two flat springs 35 and 36, carried by a film confining gate or plate 37, which may be hinged at 38. Slots 39 and 40 are cut in the aperture plate 34, just below the opening 33, to provide for the engagement of the teeth 41, of the pawl 42, with the perforations 43, in the film. This pawl is carried by the pin or pivot 44, and has mounted in its lower end a pin 45. I provide two flat springs 46 and 47, which bear against the ends of this pin 45, providing by the tension of the spring for a frictional engagement with the ends of the pin 45. The outer end of the pivot 44 has an upwardly extending portion or rod 49, which extends upwardly being provided with a button 48 at its extremity, a coil spring 50 and an abutment pin 51, being provided to hold the rod normally in the upward position.

The upwardly extending portion or rod 49, is slidably held in angle plates 52 and 53, the plate 53, forming a bearing for the lower end of the coil spring 50 aforesaid. 54 designates a stop frame moving in vertical guides 54' on the lower portion of the film guide plate 34, and having limited vertical adjustment by means of an operating screw 55 journaled in bracket ears fixedly associated with said film guide plate as shown in Fig. 4, and having an operating head 56 at its lower end for convenient manual actuation. The stop frame 54 is formed with vertical guide slots 57 and 58 for individual guiding and operative engagement with the aforesaid pintle 44 and pin or stud 45, and in the present construction are adapted to impose rectilinear movement upon said parts and limit the extent of the vertical movement of said parts in either direction.

In the above described arrangement of parts, the stop frame 54 is capable of being adjusted vertically to bring the teeth or prongs 41 of the film feeding pawl 42 into exact alinement with the marginal perforations of the picture film 32, in order to meet the slight variations in the spacings of the marginal perforations in picture films of different manufacturers. The lower end of the film 32 is carried by the take-up reel 31' provided with an outwardly extending axle, one end of which is provided with a knurled nut, for the manual operation of the spool.

The operation of the device is as follows: With the picture film carried upon the film supply and take-up reels 31 and 31' and threaded against the light aperture 33 of the film guide plate or wall 34, the initial framing of the film pictures with relation to the light aperture 33 is effected by a manual rotation of the take-up reel 31', after which the light is turned on to project the picture outwardly upon a suitable view screen.

When the lecture has been completed regarding the particular view being shown, the operator presses down upon the button 48 to attain a positive down stroke of the operating rod 49, against the resiliency of the spring 50, and a like down stroke of the film actuating pawl 42. The pressure of the spring members 46, 47 on the ends of the pin or stud 45 retards its down movement, and causes an initial tilting of the pawl 42 and an engagement of the teeth or prongs 41 thereof with the marginal perforations of the picture film 32, and owing to such engagement the picture film moves downward in unison with said pawl 42.

With the completion of the above described positive downward feed of the picture film, the operator releases his hold upon the button 48, and the resiliency of the spring 50 then acts to return the pawl 42 and associated parts to their normal raised condition. In such upward or return movement of the parts, the pressure of the spring members 46, 47 against the ends of the pin or stud 45 acts to retard its upward movement, and in consequence causes an initial tilting of the pawl 42 in a direction opposite to that above described, and a disengagement of the teeth or prongs 41 from the picture film 32, so that the upward or return movement of the parts takes place entirely independent of any engagement with the picture film 32.

Having described my invention what I regard as new and desire to secure by Letters Patent is:

1. In an intermittent film feeding mechanism, the combination of a film guide plate, a reciprocating carrier associated with said guide plate, a pawl journaled at its lower end on said carrier and having prongs on its free end for operative engagement with a picture film carried by the aforesaid guide plate, means for imparting tilting movements to said pawl at the commencement of its upward and its downward movements, and a stop head mounted in a vertically adjustable manner on the aforesaid guide plate and operatively associated with the aforesaid carrier to regulate the vertical location of said carrier, substantially as set forth.

2. In an intermittent film feeding mechanism, the combination of a film guide plate, a reciprocating carrier associated with said guide plate, a pawl journaled at its lower end on said carrier and having prongs on its free end for operative engagement with a picture film carried by the aforesaid guide plate, a horizontal pin secured to said pawl adjacent to its pivotal connection to the aforesaid carrier, and resilient members having bearing against the ends of said pin and adapted to frictionally retard the movement of the same, substantially as set forth.

3. In an intermittent film feeding mechanism, the combination of a film guide plate, a reciprocating carrier associated with said guide plate, a pawl journaled at its lower end on said carrier and having prongs on its free end for operative engagement with a picture film carried by the aforesaid guide plate, a stop head mounted in a vertically adjustable manner on the aforesaid guide plate and operatively associated with said carrier to regulate the vertical location of the carrier, a horizontal pin secured to said pawl adjacent to its pivotal connection with said carrier, and resilient members having bearing against the ends of said pin and adapted to frictionally retard the movement of the same, substantially as set forth.

4. In an intermittent film feeding mechanism, the combination of a film guide plate, a reciprocating carrier associated with said guide plate and having a horizontal pintle, a pawl journaled at its lower end on said pintle and having prongs on its free ends for operative engagement with a picture film carried by the aforesaid guide plate, a stop head carried by the said guide plate and having vertically elongated slots for stop engagement with the pintle aforesaid, and means for imparting a tilting movement to said pawl at the commencement of its upward and its downward movements, substantially as set forth.

5. In an intermittent film feeding mechanism, the combination of a film guide plate, a reciprocating carrier associated with said guide plate and having a horizontal pintle, a pawl journaled at its lower end on said pintle and having prongs on its free ends for operative engagement with a picture film carried by the aforesaid guide plate, a stop head mounted in a vertically adjustable manner on the aforesaid guide plate and having vertically elongated slots for stop engagement with the pintle aforesaid, and means for imparting a tilting movement to said pawl at the commencement of its upward and its downward movements, substantially as set forth.

WILLIAM R. MENGEL.